No. 844,946. PATENTED FEB. 19, 1907.
T. LOWE.
FLUID REGULATOR.
APPLICATION FILED JUNE 19, 1905.

Witnesses:
Frank L. A. Graham
P. Townsend

Inventor:
Thaddeus Lowe.
by James R. Townsend
his atty.

UNITED STATES PATENT OFFICE.

THADDEUS LOWE, OF PASADENA, CALIFORNIA

FLUID-REGULATOR.

No. 844,946.

Specification of Letters Patent.

Patented Feb. 19, 1907.

Application filed June 19, 1905. Serial No. 265,929.

*To all whom it may concern:*

Be it known that I, THADDEUS LOWE, a citizen of the United States, residing at South Pasadena, in the county of Los Angeles and State of California, have invented a new and useful Fluid-Regulator, of which the following is a specification.

An object of this invention is to provide a fluid-regulator which will operate efficiently with both high and low pressure and which will deliver fluids at a given pressure regulated from a supply of wide and variable pressure.

The body, diaphragm, weight, valve, and other parts of the regulator may be constructed of the usual material and in the manner well known in the art.

The invention relates to the novel construction and combination of parts hereinafter set forth.

The invention may be applied with a diaphragm and weight or with a floating regulator used with mercury seal or spring.

In the accompanying drawings the invention is illustrated as applied in a gas-regulator having a diaphragm and weight and connected in a gas-pipe to regulate the flow of gas therethrough.

The invention comprises a gas-governor having two valve-seats, one moving toward and from the other. Preferably one of said seats is smaller than the other.

In the preferred form the gas-governor has one of the two valve-seats yieldingly supported.

The accompanying drawings illustrate the invention.

Figure 1:
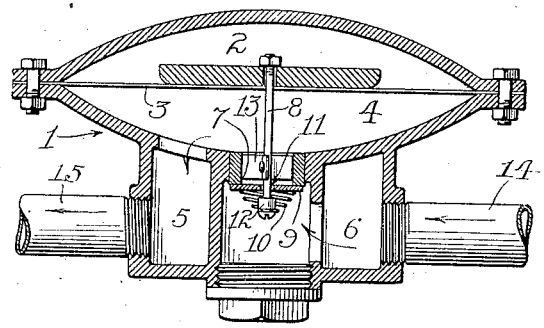
Figure 2:
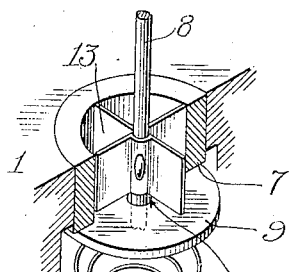
Figure 3:
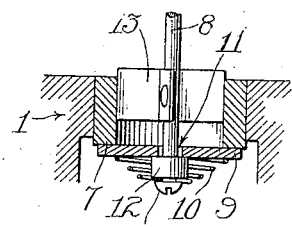
Figure 4:
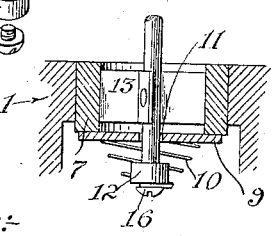
Figure 5:
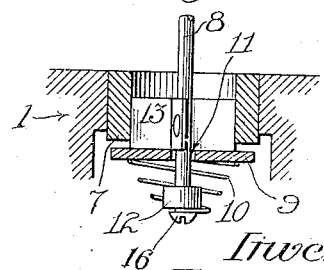

Figure 1 is an axial section of a fluid-regulator embodying this invention. Fig. 2 is a perspective detail of the working parts of the same. Figs. 3, 4, and 5 are sectional details illustrating different positions of the valves under different pressures, lessening in the order of the views.

1 is the body of the regulator; 2, the weight. 3 is the diaphragm; 4, the delivery-chamber; 5, the outlet; 6, the high-pressure inlet; 7, the fixed main valve-seat; 8, the valve-rod, and 9 is a floating combination valve and seat mounted through the medium of a spring 10 on the valve-rod 8 and provided with an orifice or high-pressure fluidway 11 around the stem.

12 is the high-pressure valve adapted to close the orifice or high-pressure fluidway 11 when the valve-rod 8 passing through the orifice is lifted by high pressure of fluid in chamber 4.

13 is a spider or crowfoot fastened to the rod 8 and sliding as a guide on the walls of the main valve-seat 7 and acting to open the low-pressure valve 9 when the pressure on the high-pressure chamber 6 is not sufficient to pass the required fluid through the orifice 11 to deliver the required quantity of gas or other fluid under the required pressure.

In practical operation, the gas-regulator being connected in the pipe 14 15, as shown, the gas or other fluid passing in the direction of the arrows inside the view in Fig. 1 exerts a pressure on the diaphragm 3, thus tending to close the high-pressure valve 12 until the escape through the outlet 5 becomes sufficiently great to allow the diaphragm 3 and its attachments to lower under the pressure of the weight 2. When the pressure is high and the outlet from 5 is closed, the parts will assume the position shown in Fig. 3; but when an outlet from 5 is opened, as by opening a gas-burner or any other fluid-opening, (not shown,) thus relieving the pressure in chamber 4, the diaphragm dropping under the pressure of weight 2 will bring the parts into the position shown in Fig. 4 to increase the fluid-passage through the regulator. Upon the opening of a maximum number of outlets or upon a corresponding diminution of pressure of the supply the valve-rod 8 will descend, bringing the crowfoot 13 against the combination floating valve and valve-seat 9, and the parts will come into the position shown in Fig. 5. The spring 10 assists in holding the floating valve and valve-seat 9 seated against the main valve-seat 7 until a predetermined downward movement of the diaphragm has occurred, and then the floating valve will recede from valve-seat 7, and as the diaphragm moves down farther the spring through the medium of the crowfoot will hold the floating valve at a correspondingly greater distance from the main valve-seat, thus allowing a greater flow of gas laterally into the way through the valve to allow only the predetermined pressure in chamber 4. When the floating-valve is free from the main valve-seat 7, it will rise and fall in correspondence to the movement of the diaphragm.

16 is a screw screwed into the under face of the high-pressure valve for holding the spring 10, which is constructed in the form of an inverted cone to carry the floating valve true to the main valve-seat.

It is to be noted that the opening between the floating valve and valve-seat 9 and the main valve-seat 7 increases rapidly in its area as the floating valve and valve-seat is allowed to move downward from the main valve-seat 7, for the reason that the opening between the main valve-seat and the floating valve is annular and the supply is taken in from all sides around the valve-seat 7. If the spring 10 were omitted, the gradual variation of the pressure might not be so regular and the floating valve 9 would be liable to drop suddenly or to flutter; but by means of the spring 10 the movement is made steadier and truer; nor is it absolutely necessary for the operation of the regulator that any means, as crowfoot 13, fixed to and moving with the valve-rod, should be provided to move the floating valve and valve-seat 9 away from the main valve-seat 7, for the reason that the gravity of the floating valve and valve-seat 9 will operate to open the way between the same and the main valve-seat. By use of the crowfoot 13, however, the opening of the way between the floating valve and the main valve-seat is made positive.

I do not limit the invention by the use of a spring and may dispense with the same without departing from the principle of this invention in its broader sense.

What I claim is—

1. A fluid-regulator having a high-pressure valve operated by fluid-pressure, a main valve-seat, and a combination floating valve and valve-seat between the high-pressure valve and the main valve-seat and provided with an orifice adapted to be closed by the high-pressure valve when under excessive pressure, a pressure-operated valve-stem for the high-pressure valve and means on the valve-stem for unseating the floating valve.

2. A fluid-regulator having a high-pressure valve, a main valve-seat, a combination floating valve and valve-seat between the high-pressure valve and the main valve-seat and adapted to seat the high-pressure valve, and means moving with the high-pressure valve to move the combination floating valve and valve-seat from the main valve-seat.

3. A fluid-regulator having a high-pressure valve operated by the fluid-pressure, a main valve-seat, a combination floating valve and valve-seat between the high-pressure valve and main valve-seat, and provided with an orifice adapted to be closed by the high-pressure valve when under excessive pressure, and a spring moving with the high-pressure valve and operating to hold the floating valve and valve-seat against the main valve-seat during an intermediate movement of the high-pressure valve.

4. A fluid-regulator having a high-pressure valve operated by the fluid-pressure, a main valve-seat, a combination floating valve and valve-seat between the high-pressure valve and the main valve-seat and provided with an orifice adapted to be closed by the high-pressure valve when under excessive pressure, a spring moving with the high-pressure valve and operating to hold the floating valve and valve-seat during an intermediate movement of the high-pressure valve and means moving with the high-pressure valve to move the floating valve and valve-seat away from the main valve-seat under the lower pressure.

5. A fluid-regulator having a high-pressure valve, a main valve-seat, a floating valve and valve-seat between the high-pressure valve and main valve-seat and having an orifice adapted to seat the high-pressure valve, a spring for supporting the floating valve and valve-seat, and a screw screwed into the under face of the high-pressure valve for holding said spring.

6. A fluid-regulator having a main valve-seat, a floating valve provided with an orifice, a high-pressure valve to close the orifice and a spring carried by the high-pressure valve and constructed in the form of an inverted cone to carry the floating valve to close the main valve-seat.

7. In a fluid-regulator a floating valve, a high-pressure valve and a spring between said valve and moving therewith to operate the floating valve.

8. A main valve-seat, a floating valve therefor having an orifice and a high-pressure vlave for closing communication through and for seating the floating valve.

9. A main valve-seat, a floating valve therefor having an orifice, a valve-rod through the orifice and a high-pressure valve on the valve-rod for closing communication through the valve.

10. The combination of a valve-seat, a floating valve therefor provided with a passage therethrough, a valve-stem, a valve on the valve-stem to close the passage through the floating valve, means for operating the valve-stem and a crowfoot on the valve-stem for unseating the floating valve.

In testimony whereof I have hereunto set my hand, at Los Angeles, California, this 13th day of June, 1905.

THADDEUS LOWE.

In presence of—
JAMES R. TOWNSEND,
JULIA TOWNSEND